United States Patent
Tresse et al.

(10) Patent No.: US 8,539,664 B2
(45) Date of Patent: *Sep. 24, 2013

(54) METHOD OF FASTENING FIRST AND SECOND THERMOPLASTIC PARTS, AND TWO-PART ASSEMBLY

(75) Inventors: David Tresse, Polaincourt (FR); Marc Verwaerde, Moras (FR)

(73) Assignee: Compagnie Plastic Omnium, Lyons (FR)

( * ) Notice: Subject to any disclaimer, the term of this patent is extended or adjusted under 35 U.S.C. 154(b) by 780 days.

This patent is subject to a terminal disclaimer.

(21) Appl. No.: 12/449,472

(22) PCT Filed: Feb. 14, 2008

(86) PCT No.: PCT/FR2008/050250
§ 371 (c)(1),
(2), (4) Date: Oct. 8, 2009

(87) PCT Pub. No.: WO2008/104718
PCT Pub. Date: Sep. 4, 2008

(65) Prior Publication Data
US 2010/0037449 A1 Feb. 18, 2010

(30) Foreign Application Priority Data
Feb. 15, 2007 (FR) ........................................ 0753290

(51) Int. Cl.
*B21D 39/00* (2006.01)
*B29C 65/00* (2006.01)

(52) U.S. Cl.
USPC .............................................. 29/509; 264/249

(58) Field of Classification Search
USPC ......... 29/505, 509, 439, 428, 525.13, 525.14, 29/525.15, 897.2; 264/249
See application file for complete search history.

(56) References Cited

U.S. PATENT DOCUMENTS 3,247,848 A * 4/1966 Mathison ......................... 602/78
5,613,542 A * 3/1997 Tuzmen et al. .............. 160/236
7,390,037 B2 * 6/2008 Migieu et al. ................. 293/102

FOREIGN PATENT DOCUMENTS

GB 2 173 139 A 10/1986
JP A-61-84227 4/1986

* cited by examiner

*Primary Examiner* — John C Hong
(74) *Attorney, Agent, or Firm* — Oliff & Berridge, PLC

(57) ABSTRACT

The invention relates to a method of fastening first and second thermoplastic parts of a motor vehicle, the first part having a protuberance projecting from a face and the second part having an engagement surface, the method consisting in bringing the second part into contact with the face of the first part, in heating the protuberance, and in plastically deforming the protuberance towards the second part so that the second part is gripped between the face of the first part and an end portion of the protuberance.

11 Claims, 1 Drawing Sheet

METHOD OF FASTENING FIRST AND SECOND THERMOPLASTIC PARTS, AND TWO-PART ASSEMBLY

FIELD OF THE INVENTION

This invention relates to the technical field of fastening thermoplastic parts, in particular motor vehicle parts.

BACKGROUND OF THE INVENTION

A bumper skin of a motor vehicle to which various elements such as a reinforcement or a sensor support are added and fastened is already known in the state of the art. One known method of fastening these various elements is staking.

For example, to fasten a reinforcement on a bumper skin, the bumper skin is equipped with a protuberance projecting from its hidden side and a hole is made in the reinforcement. The reinforcement is then placed in contact with the side of the bumper skin that has the protuberance projecting so that the protuberance goes through the hole, leaving an end portion sticking out. The end portion of the protuberance is then fully heated, for example using ultrasound waves generated by a sonotrode, and a rivet head is formed by crushing the protuberance vertically.

This known method of fastening generally involves heating the protuberance along its entire length. The protuberance is often heated and crushed using the same tool which, during heating, is near the upper end of the rib, thereby limiting its movements during crushing. The heating duration is relatively long, so that the heat propagates along the entire length of the protuberance and the protuberance material is completely melted.

In addition, by directing the flow of heat along the vertical direction of the protuberance, there is a risk of heating the side of the bodywork element from which the protuberance is projecting, which may cause appearance faults in this bodywork part.

Lastly, by crushing the protuberance towards the base of the protuberance, i.e. perpendicular to the bodywork element, there is a risk of pressing the surface of this element, thereby causing appearance faults.

OBJECT AND SUMMARY OF THE INVENTION

The invention seeks to provide a method of fastening which does not present these disadvantages.

The invention therefore relates to a method of fastening first and second thermoplastic parts of a motor vehicle, wherein the first part has a protuberance projecting from one side and the second part has an engagement surface, the method comprising the following steps:
  bringing the second part into contact with said side of the first part, the second part being designed so that the angle between a vector normal to the side of the first part and a vector normal to the engagement surface is small and so that the engagement surface is close to the protuberance,
  heating the protuberance,
  plastically deforming the protuberance towards the second part using a deformation means moving substantially parallel to the side of the first part, so that at least one end portion of the protuberance is in contact with the engagement surface.

Preferably, during the step of bringing into contact, the second part rests against the protuberance, which offers the advantage of guiding the positions of the two parts with respect to each other.

The fact that the angle between the vectors normal to the two surfaces is small means that the two surfaces are oriented substantially in the same direction. When the angle is zero, the two surfaces are substantially parallel.

The step of heating the protuberance is relatively short since it is simply intended to soften the protuberance sufficiently so that it can be plastically deformed towards the second part by the deformation means. In addition, only the base of the protuberance needs to be softened to allow plastic deformation of the protuberance. In the remainder of the description, we will speak of folding the protuberance, although it is plastically deformed. This step lasts about 3 to 4 seconds, and no longer than 6 seconds. This heating time is less than the time required for a traditional staking process (about 9 seconds). With staking in fact, the protuberance must be fully melted so that it can be crushed vertically.

In addition, due to the fact that the protuberance is only heated for a relatively short time, the cooling time is short.

Since the cycle time of the fastening process is reduced, this fastening operation can be robotised, with a single robot making several fastening points successively between the two parts. Since the welding devices of the state of the art have a long cycle time, several welds must be made simultaneously and complex devices must therefore be developed specifically for each bodywork part to be assembled.

Lastly, the protuberance can be heated from the side which, apart from reducing the heating time, prevents the formation of heat marks on the surface of the first part.

The fastening method according to the invention may also include one or more of the following characteristics.
  The angle between the two vectors is substantially zero.
  The method comprises an additional step of pressing the end portion against the second part, to cause surface fusion of the parts of the end portion and the engagement surface in contact, and mix the melted materials.
  Plastic deformation and pressing of the end portion against the second part are implemented by the deformation means. The deformation means moves in a plane substantially parallel to the side of the first part.
  The deformation means is operated by a robot.
  The deformation means comprises a roller, a presser, a pad or a metal block, operated by a robot.
  The end portion of the protuberance and the engagement surface are heated simultaneously, in particular using a blast of hot air, a laser or infrared radiation
  The protuberance is a tongue or rib, the protuberance preferably being substantially normal to the side of the first part.
  The first part is a bodywork part and the second part is a reinforcement of the bodywork part or a sensor support.
  The second part comprising a through hole opening onto the engagement surface, during the step of bringing into contact, the protuberance goes through the hole, with its end portion sticking out.

The invention also relates to an assembly of first and second thermoplastic parts of a motor vehicle, wherein:
  the first part comprises a protuberance projecting from one side,
  the second part is in contact with the side of the first part,
  an end portion of the protuberance is in contact with an engagement surface of the second part,
  the angle between a vector normal to the engagement surface and a vector normal to the side of the first part is small, and the end portion and the engagement surface are fastened by mixing their materials.

BRIEF DESCRIPTION OF THE DRAWINGS

It will be easier to understand the invention on reading the description below, given as an example and referring to the attached drawings, in which.

MORE DETAILED DESCRIPTION

Figure 1:
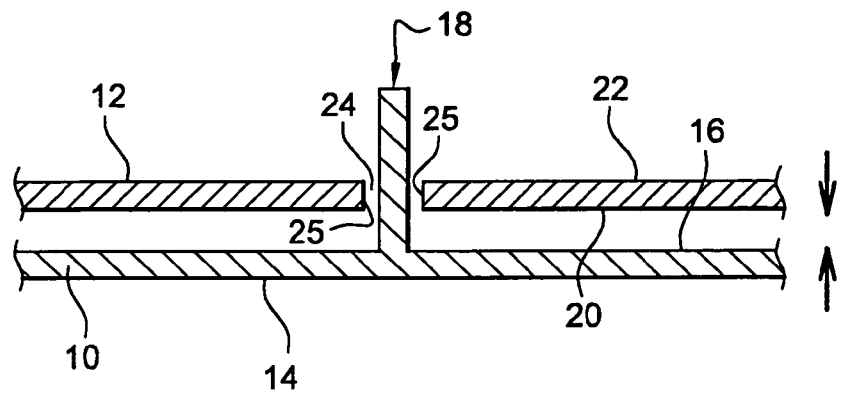
FIGS. 1, 2 and 3 represent three successive steps of the fastening method according to the invention

First 10 and second 12 thermoplastic parts of the motor vehicle are considered. In the example shown on the figures, the first part 10 is a bumper skin 10 and the second part 12 is a bumper skin 10 reinforcement 12.

The bumper skin 10 comprises an appearance side 14 and an opposite side 16. The bumper skin 10 comprises a rib 18 forming a protuberance projecting through the opposite side 16. The rib 18 is moulded with the skin 10 and is substantially perpendicular to the surface 16 of the first part 10.

The reinforcement part 12 comprises a contact surface 20 and an opposite surface 22. In addition, the part 12 comprises a hole 24 crossing completely through the part 12, i.e. from one surface 20 to the other 22. The hole 24 is bounded by an edge 25 of the contact surface 20. A part 27 of the contact surface forms an engagement surface.

The fastening method according to the invention consists firstly in bringing into contact the reinforcement part 12 with the bodywork part 10 so that the rib 18 enters the hole 24 and so that the contact surface 20 of the reinforcement part 12 is in contact with the opposite surface 16 of the bodywork part 10. This step is represented on FIG. 1. In this configuration, the protuberance 18 is then close to the edge 25 of the hole 24.

Figure 2:
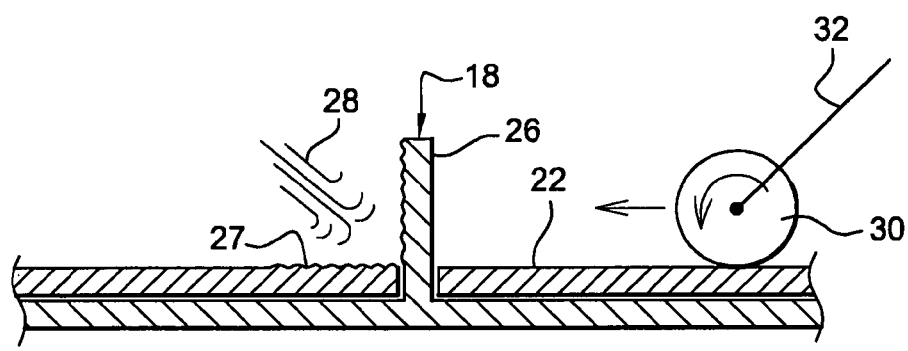

When the two parts are in contact, an end portion 26 of the rib 18 projects out of the hole 24, as shown on FIG. 2. So that the end portion 26 projects out of the hole 24, the height of the rib is greater than the thickness of the part 12.

The angle between a vector normal to the side of the first part and a vector normal to the engagement surface 27 is small, preferably zero.

During a next step represented on FIG. 2, the end portion 26 and the engagement surface 27 of the opposite surface 22 of the reinforcement part 12 are heated by a blast of hot air 28. This heating step softens the end portion 26 and the engagement surface 27 of the opposite surface 22 of the reinforcement part 12. This also causes surface fusion of the thermoplastic material of the end portion and of the engagement surface 27.

During a next step, the end portion 26 is plastically deformed towards the part 12, so that the part 12 is gripped between the opposite side 16 of the part 10 and the end portion 26. The end portion is therefore in contact with the engagement surface 27 of the opposite surface 22 of the reinforcement part 12 which was heated by the blast of hot air 28. This step is represented on FIG. 3.

Figure 3:
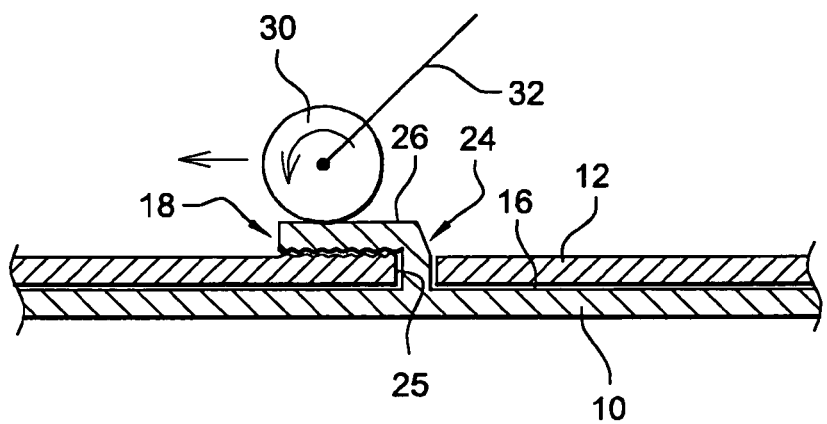

As shown on FIG. 3, the end portion 26 is folded by a roller 30 forming a deformation means operated by a robot 32, the roller moving along the opposite surface 22 of the reinforcement part 12, in a plane substantially parallel to the side 16 of the part 10. During its displacement, the roller may, optionally, apply a vertical force so as to press the end portion 26 against the engagement surface of the reinforcement part 12, and improve the mixing of the materials melted at the interface. We sometimes speak of "bonding pool".

Finally, a last step consists in allowing the assembly of the two parts fastened together to cool. After this cooling step, the two parts are fastened together since the engagement surface 27 of the opposite surface 22 is engaged with the end portion 26 of the protuberance 18, both by the fusion of their thermoplastic materials at the interface and by the mechanical retention of the reinforcement 12 between the end portion 26 and the opposite surface 16 of the bodywork part 10. This mechanical retention prevents the two parts 10 and 12 from separating.

The invention is not limited to the embodiment which has just been described.

According to a variant not shown, the blast of hot air 28 is only directed towards the end portion 26, which offers the advantage of avoiding possible damage to the appearance surface 14 of the part 10. During the folding step, the heat of the end portion 26 is transmitted by contact to the engagement surface 27 of the part 12, which causes surface fusion of the material on the surface and mixes the melted materials.

Figure 4:
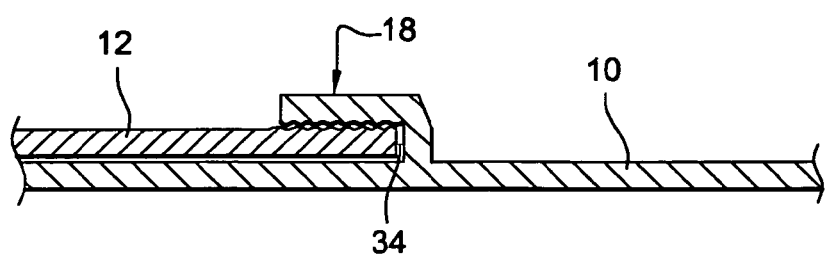
FIG. 4 represents two parts fastened together using the method of the invention according to a variant.

According to another variant shown on FIG. 4, the part 12 does not have a hole and its contact surface 20 is bounded by an edge 34. The edge 34 is part of the edge of the part 12 which bounds the outer contour of this part. During the step of bringing into contact the two parts 10 and 12, the edge 34 of the part 12 is near the protuberance, preferably against the base of the protuberance 18 so that the two parts are positioned with respect to each other. The protuberance is then folded towards the edge 34 on the engagement surface 27 of the part 12.

The invention claimed is:

1. Method of fastening first and second thermoplastic parts of a motor vehicle, wherein the first part has a protuberance projecting from one side and the second part has an engagement surface, the method comprising the following steps:
    bringing the second part into contact with said side of the first part, the second part being designed so that the angle between a vector normal to the side of the first part and a vector normal to the engagement surface is small and so that the engagement surface is close to the protuberance, wherein the protuberance is a tongue or rib, and the protuberance is substantially perpendicular to the side of the first part,
    heating the protuberance,
    plastically deforming the protuberance towards the second part using a deformation means moving substantially parallel to the side of the first part, so that at least one end portion of the protuberance is in contact with the engagement surface.

2. Method according to claim 1, wherein the angle between the two vectors is substantially zero.

3. Method according to claim 1, comprising an additional step of pressing the end portion against the second part, to cause surface fusion of the parts of the end portion and the engagement surface in contact, and mix the melted materials.

4. Method according to claim 3, wherein plastic deformation and pressing of the end portion against the second part are implemented by the deformation means.

5. Method according to claim 4, wherein the deformation means is operated by a robot.

6. Method according to claim 1, wherein the deformation means comprises a roller, a presser, a pad or a metal block, operated by a robot.

7. Method according to claim 1, wherein the end portion of the protuberance and the engagement surface are heated simultaneously.

8. Method according to claim 1, wherein the end portion of the protuberance and the engagement surface are heated simultaneously using a blast of hot air, a laser or infrared radiation.

9. Method according to claim 1, wherein the first part is a bodywork part and the second part is a reinforcement of the bodywork part or a sensor support.

10. Method according to claim 1, wherein the second part comprising a through hole opening onto the engagement surface, during the step of bringing into contact, the protuberance goes through the hole, with its end portion sticking out.

11. Assembly of first and second thermoplastic parts of a motor vehicle, wherein:
- the first part comprises a protuberance projecting from one side,
- the second part is in contact with the side of the first part,
- an end portion of the protuberance is in contact with an engagement surface of the second part by plastically deforming the protuberance towards the second part using a deformation means moving substantially parallel to the side of the first part,
- the angle between a vector normal to the engagement surface and a vector normal to the side of the first part is small, and
- the end portion and the engagement surface are fastened by mixing their materials.

\* \* \* \* \*